(12) United States Patent
Pashov

(10) Patent No.: US 12,393,474 B2
(45) Date of Patent: Aug. 19, 2025

(54) CROSS MACHINE REQUEST FORWARDING

(71) Applicant: Microsoft Technology Licensing, LLC, Redmond, WA (US)

(72) Inventor: Ivan Dimitrov Pashov, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1025 days.

(21) Appl. No.: 17/461,824

(22) Filed: Aug. 30, 2021

(65) Prior Publication Data

US 2023/0068635 A1    Mar. 2, 2023

(51) Int. Cl.
*G06F 9/54* (2006.01)
*H04L 45/58* (2022.01)
*H04L 67/02* (2022.01)
*H04L 69/22* (2022.01)

(52) U.S. Cl.
CPC .............. *G06F 9/545* (2013.01); *G06F 9/546* (2013.01); *H04L 45/58* (2013.01); *H04L 67/02* (2013.01); *H04L 69/22* (2013.01)

(58) Field of Classification Search
CPC ......... G06F 9/545; G06F 9/546; H04L 45/58; H04L 67/02; H04L 69/22
See application file for complete search history.

(56) References Cited

U.S. PATENT DOCUMENTS

| | | | |
|---|---|---|---|
| 2006/0190609 | A1 | 8/2006 | Chetuparambil et al. |
| 2008/0267217 | A1* | 10/2008 | Colville ................. H04L 47/38 370/477 |
| 2009/0240874 | A1* | 9/2009 | Pong ................... G06F 12/0223 711/170 |
| 2021/0243247 | A1* | 8/2021 | He ......................... H04L 67/51 |

OTHER PUBLICATIONS

Detal, et al., "Multipath in the Middle(Box)", In Proceedings of the workshop on Hot topics in middleboxes and network function virtualization, Jan. 1, 2013, pp. 1-6.
"International Search Report and Written Opinion Issued in PCT Application No. PCT/US22/036598", Mailed Date: Sep. 26, 2022, 12 Pages.
Zhou, et al., "Data Stream Splicing for Web Proxy Cache Optimization", In Proceedings of Japan-China Joint Workshop on Frontier of Computer Science and Technology, Nov. 1, 2006, 6 Pages.

* cited by examiner

*Primary Examiner* — Chris Parry
*Assistant Examiner* — Steven C Nguyen
(74) *Attorney, Agent, or Firm* — Newport IP, LLC; Jacob P. Rohwer

(57) ABSTRACT

A front-end computing system provides cross machine message forwarding through a kernel mode component. The message is received in a kernel mode queue of the front-end computing system. The message includes one or more headers and an entity body including one or more data blocks. A user mode router in the front-end computing system designates a computing system to process the message based at least in part on the one or more headers. The (Continued)

one or more data blocks are passed through the kernel mode queue in the front-end computing system to the designated computing system without passing the one or more data blocks to the user mode router in the front-end computing system.

11 Claims, 7 Drawing Sheets

CROSS MACHINE REQUEST FORWARDING

BACKGROUND

When executing web services on a webserver, HTTP (HyperText Transfer Protocol) requests are received from a client system by the webserver through a network stack (e.g., a TCP/IP (Transmission Control Protocol/Internet Protocol) stack) executing on the webserver. Responses are generated by the webserver and communicated to the client system, taking a reverse path through the network stack. Generally, requests and responses are referred to as "messages" and may include an entity body. An entity body may be communicated across the network in multiple data blocks according to the network protocol (e.g., if the entity body is too large for a single network packet). In some implementations, the webserver functionality is processed by multiple servers, such as a front-end server and a back-end server.

SUMMARY

The described technology provides cross machine message forwarding through a front-end computing system. The message is received in a kernel mode queue of the front-end computing system. The message includes one or more headers and an entity body including one or more data blocks. A user mode router in the front-end computing system designates a computing system to process the message based at least in part on the one or more headers. The one or more data blocks are passed through the kernel mode queue in the front-end computing system to the designated computing system without passing the one or more data blocks to the user mode router in the front-end computing system.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

User satisfaction in the web space is tightly correlated with the perception of responsiveness. A study has found that every 100 milliseconds of delay for web services means a 2.4% to 7.1% reduction in conversation rate. Another study found that users are 24% less likely to abandon page loads when sites reduce their delay until being input ready to 100 milliseconds. Accordingly, high latency drives user dissatisfaction with online services, and web services can improve user experience by minimizing latency. Latency is increased by HTTP processing overhead when requests are routed through multiple servers. However, this multi-server routing is often unavoidable in modern deployments. The described technology provides new forwarding mechanisms that will allow online service deployments to intelligently reduce high-latency request processing by front-end servers when forwarding requests to back-end servers.

Multiple-hop request processing (e.g., involving front-end and back-end servers) is becoming more common with the deployment of micro-service architecture. As such, front-end servers are involved with each user request to forward the user requests to appropriate back-end servers for request processing. Multiple-hop request processing can result in increased processing overhead due to multiple passes through HTTP stacks in front-end servers that have nothing to do with the speed of the network pipes connecting the front-end servers. This overhead translates into costs of server space and maintenance that provide little value to the customer or organization.

Fast message forwarding provides functionality for reducing such overhead in front-end servers. For example, when asking Http.sys to move the request to another process queue is impossible, a user mode router process can instruct Http.sys in the kernel to handle moving the data blocks of the request to the back-end server without passing the data blocks to the user mode router process. A similar fast message forwarding process can be executed in the reverse direction when the message is a response. Furthermore, in some implementations, the processing of a request and a corresponding response need not be strictly sequential. In other words, fast forwarding of the data blocks of a request can occur concurrently with the fast forwarding of the data blocks of a corresponding response.

Figure 1:
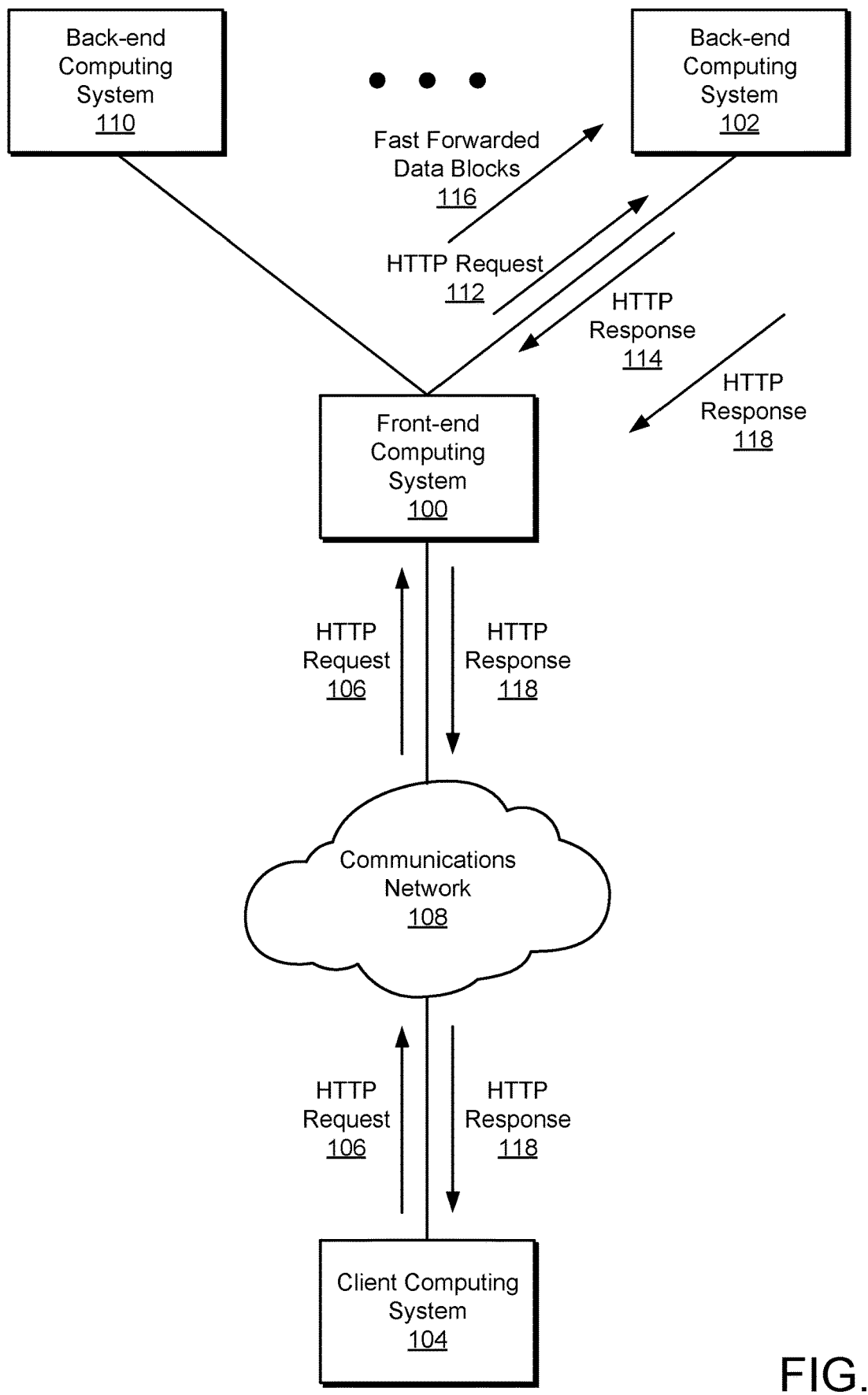
FIG. 1 illustrates an example front-end computing system supporting fast cross machine request forwarding to a back-end computing system.

FIG. 1 illustrates an example front-end computing system 100 supporting fast cross machine request forwarding to a back-end computing system 102. A client computing system 104 transmits a request, such as an HTTP request 106, through a communications network 108 to the front-end computing system 100. An HTTP request can include one or more headers and, optionally, an entity body (which can be made up of one or more data blocks communicated over the network). Generally, HTTP request headers can include a general header, a client request header, and/or an entity header (i.e., a header field defining metainformation about the entity body, if any), and HTTP response headers may include a general header, a server response header, and/or an entity header. The HTTP request 106 is received in a front-end queue of a kernel mode webserver driver (e.g., http.sys) of the front-end computing system 100.

It should be understood that much of this description is based on the fast forwarding of data blocks associated with a request. Nevertheless, fast forwarding can also be applied to data blocks associates with a response, the details of which are the same as those relating to the request flow.

Typically, the front-end computing system 100 is communicatively coupled to multiple back-end computing systems (e.g., the back-end computing system 102 and a back-end computing system 110), and a user-mode router process in the front-end computing system designates one of the back-end computing systems to process the HTTP request 106. In one implementation, the router process designates the appropriate back-end computing system by extracting one or more headers from the HTTP request 106, creating a new HTTP request 112 with the one or more headers, and sending the new HTTP request 112 to one of the back-end computing systems. If the corresponding back-end computing system can process the HTTP request 106, based on the header information in the new HTTP request 112, the back-end computing system 102 will respond with an HTTP response 114 indicating its acceptance. If the back-end computing system 102 cannot process the HTTP request 106, it will indicate its non-acceptance in the HTTP response 114, and the front-end computing system 100 will check with other back-end computing systems until a viable processing system is found.

The front-end computing system 100 processes the HTTP response 114 to confirm acceptance by the back-end computing system 102 and then instructs a kernel mode webserver driver to fast forward the data blocks 116 of entity body of the HTTP request 106 through kernel mode in the front-end computing system 100 to the back-end computing system 102, without passing the data blocks 116 through the user mode of the front-end computing system 100. In one implementation, the data blocks are transmitted as a sequence of data packets to the back-end computing system 102. In this manner, the data packets (e.g., IP data packets) of the data blocks 116 are forwarded without the overhead of passage through user mode or the generation of separate HTTP requests in user mode.

After processing the data blocks 116 of the HTTP request 106, the back-end computing system 102 generates an HTTP response 118, acknowledging completion of the request and/or returning results of the processing. The front-end computing system 100 passes the HTTP response 118 (or its own version of the response) to the client computing system 104. It should be understood that the response from the back-end computing system 102 may itself include an entity body of one or more data blocks, which the router process of the front-end computing system 100 may send to the client computing system 104 using fast forwarding through the kernel mode.

In an implementation (not shown), the front-end computing system 100 can also (or alternatively) execute a fast forwarding process on the HTTP response 118, in a similar manner as performed on the HTTP request 106. In this implementation, the front-end computing system 100 instructs its kernel mode webserver driver to fast forward the data blocks of an entity body of the HTTP response 118 through kernel mode in the front-end computing system 100 to the client computing system 104 without passing the data blocks through the user mode of the front-end computing system 100. Accordingly, similar overhead reductions can be achieved in the response flow as well.

Figure 2:
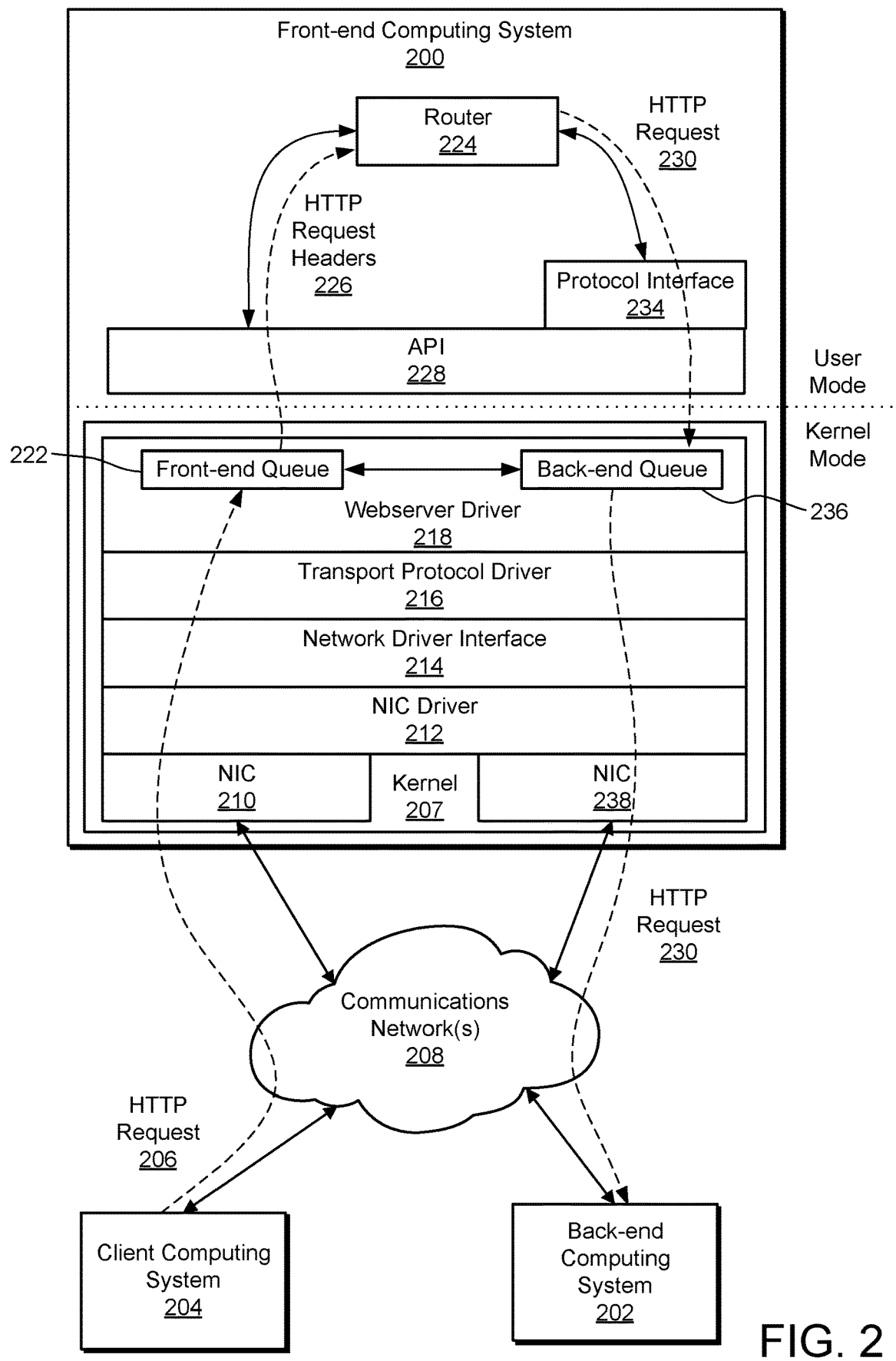
FIG. 2 illustrates an example front-end computing system processing a request in support of cross machine request forwarding to a back-end computing system.
Figure 3:
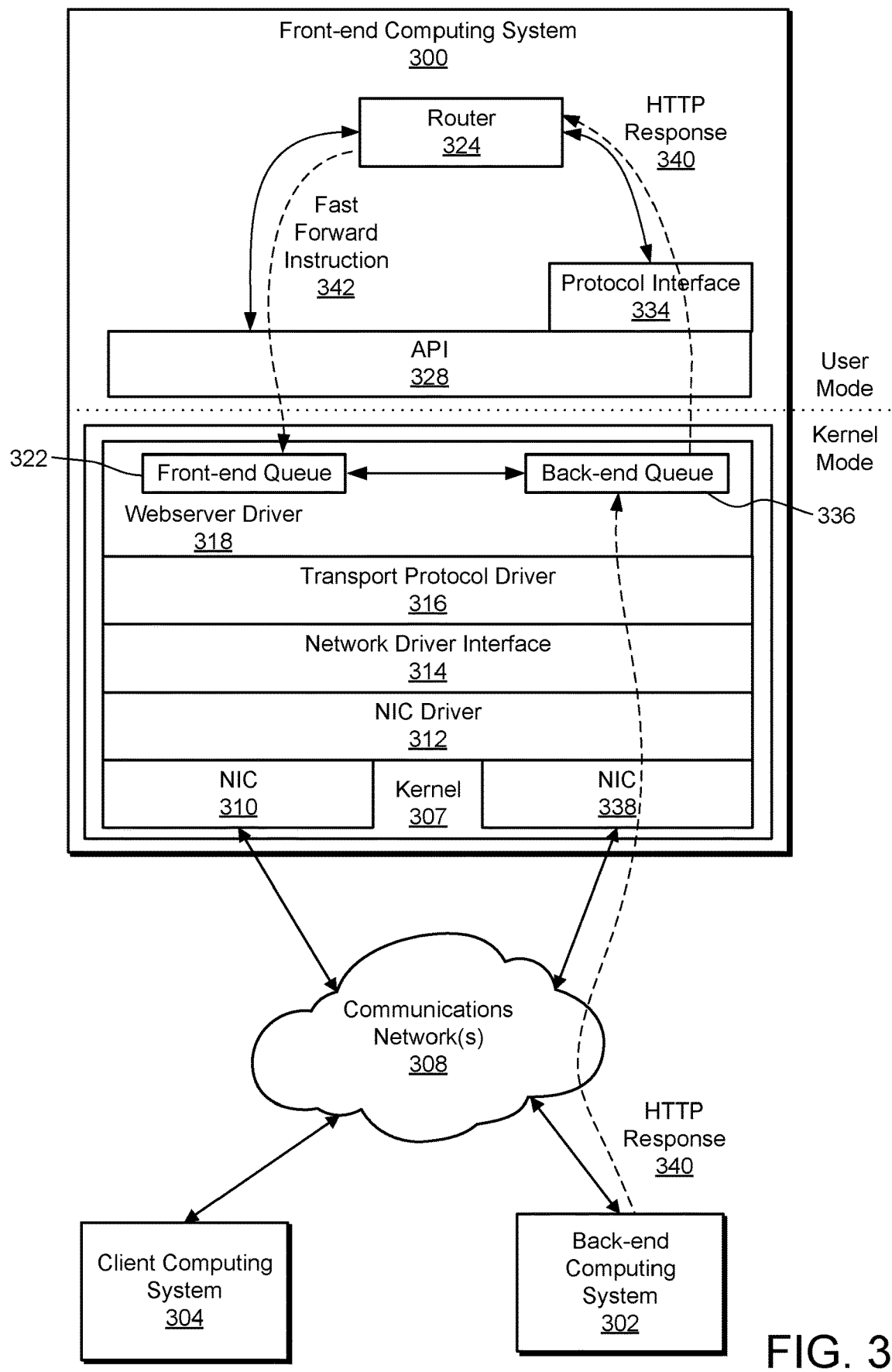
FIG. 3 illustrates a router in an example front-end computing system instructing a kernel mode webserver driver to fast forward data blocks of a request to a designated back-end computing system.
Figure 4:
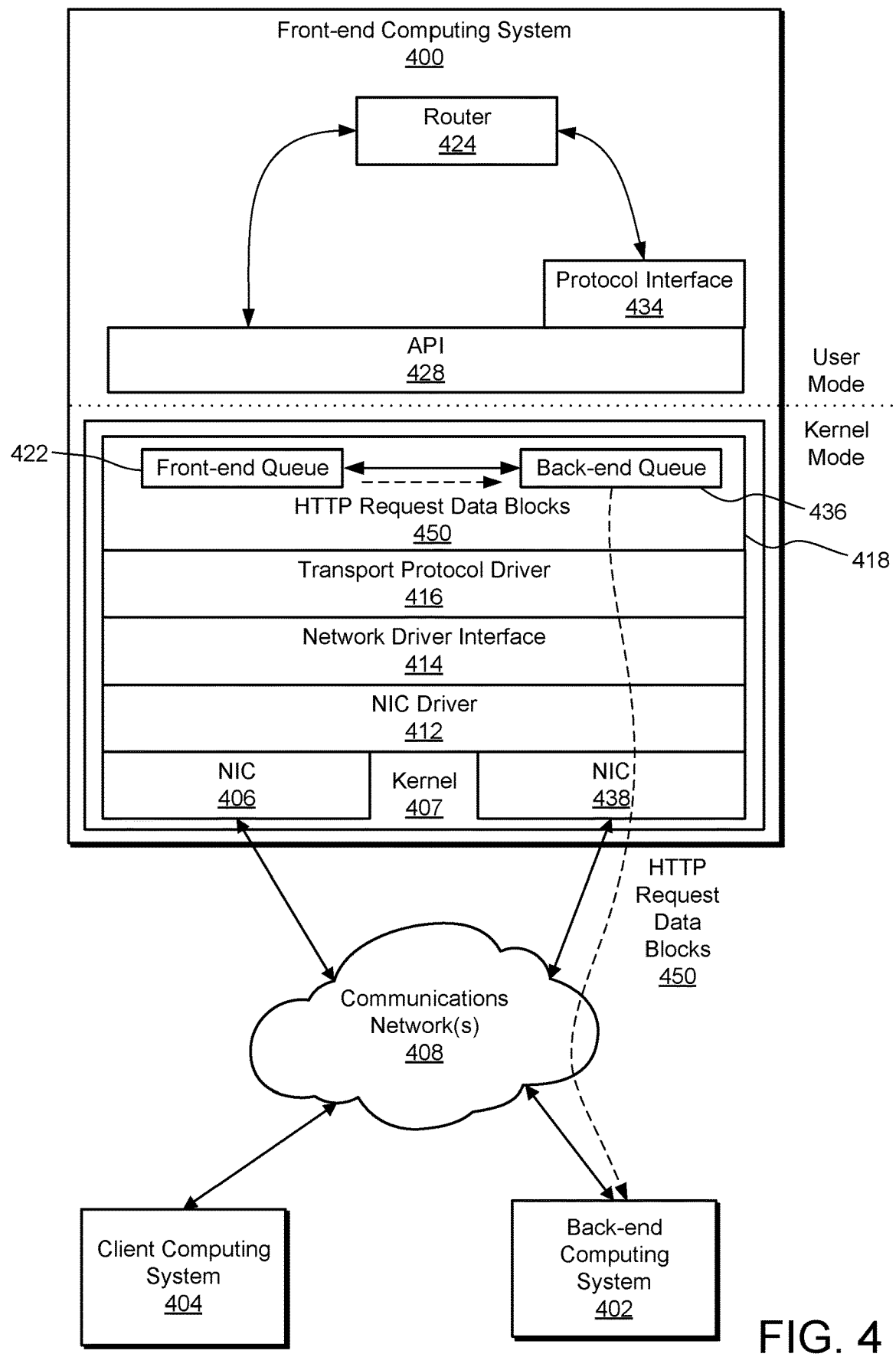
FIG. 4 illustrates a kernel mode webserver driver of a front-end computing system fast forwarding data blocks of a request to a designated back-end computing system.
Figure 5:
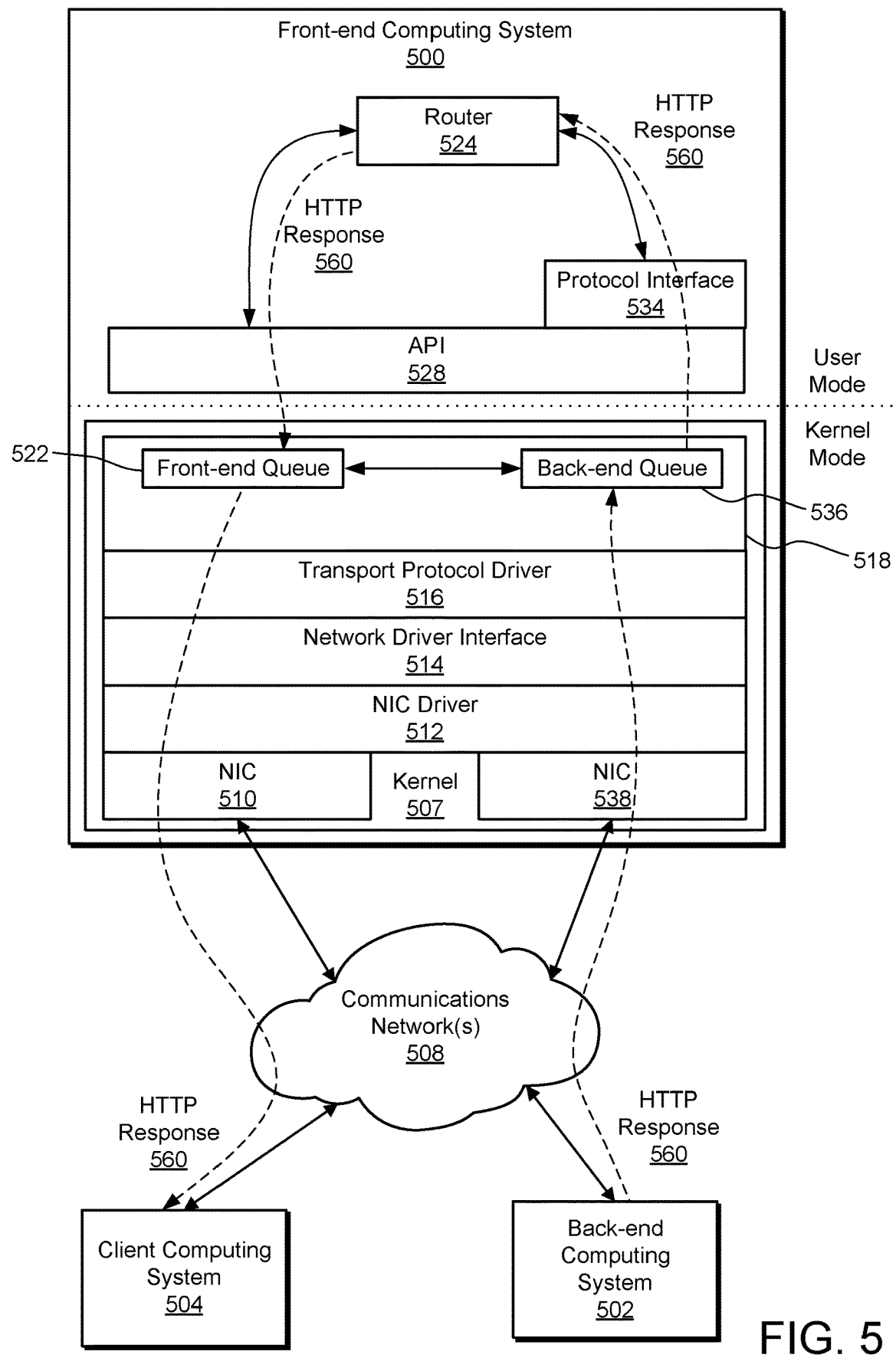
FIG. 5 illustrates an example front-end server computing system processing a response from a back-end computing system after completion of processing a fast forwarded request by the back-end computing system.

FIGS. 2-5 illustrate sequential stages of an example fast forwarding flow for a request from a client. FIG. 2 illustrates an example stage of a front-end computing system sending one or more headers of a request to a candidate back-end computing system (e.g., to determine whether the candidate back-end computing system will accept the responsibility of processing the request from the client). FIG. 3 illustrates an example stage of a front-end computing system receiving a response from a candidate back-end computing system indicating acceptance of the responsibility of processing the request from the client and then instructing a webserver driver to fast forward one or more data blocks of the entity body of a request through kernel mode without passing through user mode of the front-end computing system. FIG. 4 illustrates an example stage of a front-end computing system fast forwarding one or more data blocks of the entity body of a request through kernel mode to a back-end computing system without passing through user mode of the front-end computing system. FIG. 5 illustrates an example stage of a front-end computing system forwarding a response from a back-end computing system (which processed an original request) to the client computing system that initiated the original request. It should be understood that the response from the back-end computing system may also include an entity body, and the front-end computing system may also apply fast forwarding to the data blocks of the entity body of the response. Furthermore, in some implementation, the stages need not be strictly sequential, in that the processing of the request and the corresponding response may overlap to some extent, whether either direction of the respective processing employs fast forwarding or not.

FIG. 2 illustrates an example front-end computing system 200 processing a request in support of cross machine request forwarding to a back-end computing system 202. A client computing system 204 transmits an HTTP request 206 through a communications network 208 to the front-end computing system 200. The front-end computing system 200 receives the HTTP request via the communications network 208 and a network interface 210 (e.g., a "NIC" or "network interface card") of the webserver 200. The requests and responses are communicated through a network stack in the kernel 207 of the operating system of the front-end computing system 200.

In the illustrated implementation, the network stack includes multiple hardware and software layers, including the network interface 210, a NIC driver 212, a network driver interface 214 (e.g., ndis.sys), and a transport protocol driver 216 (e.g., a TCP/IP protocol driver, such as tcpip.sys). Nevertheless, it should be understood that other network stack configurations are contemplated for other implementations of the described technology. A webserver driver 218 manages the front-end queue 222 and the back-end queue 236. For example, http.sys is an HTTP protocol driver running as a kernel mode webserver driver between a TCP/IP protocol driver and the user mode router and service processes (e.g., a web service processes, HTTP service process).

The HTTP request 206 is received by the front-end computing system 200 in a front-end queue 222. A router process ("router 224") in the user mode can extract the HTTP request headers 226 of the HTTP request 206 through an API 228 (Application Programming Interface). The router 224 generates an HTTP request 230 based on HTTP request headers 226 and sends it to a back-end computing system 202 through a protocol driver 234, the API 228, a back-end queue 236 in the webserver driver 218, and another NIC 238. The back-end computing system 202 evaluates the HTTP request 230 to determine whether it can process the HTTP request 206.

It should be understood that, in the illustrated implementation, a unified network stack in kernel mode (e.g., including the NIC driver 212, the network driver interface 214, the transport protocol driver 216, and the webserver driver 218) is used in fast forwarding data blocks of an entity body in message (request or response) flow. Accordingly, for fast forwarding in either direction, the one or more data blocks of an entity body may flow exclusively through the network stack in kernel without flowing through user mode network stack components, thus reducing unnecessary latency.

In some implementations, the front-end computing system 200 need not employ multiple NICs. Furthermore, in some implementations, one or more NICs may communicate across different networks (e.g., the public Internet and a private back-end network of a datacenter). The implementation variations also apply to the examples of FIG. 3-5.

FIG. 3 illustrates a router 324 in an example front-end computing system 300 instructing a kernel mode webserver driver 318 to fast forward data blocks of a request to a designated back-end computing system 302. In the illustrated part of the processing flow, the back-end computing system 302 has received an HTTP request with the header information of an HTTP request received from a client computing system 304. The back-end computing system 302 responds to indicate whether it can process the HTTP request from the client computing system 304. In either case, the back-end computing system 302 generates an HTTP response 340 and sends it to the front-end computing system 300, indicating the result of this determination.

The HTTP response 340 is received by the front-end computing system 300 in a back-end queue 336 through a network stack. In the illustrated implementation, the network stack includes multiple hardware and software layers, including the NIC 338, a NIC driver 312, a network driver interface 314 (e.g., ndis.sys), and a transport protocol driver 316 (e.g., a TCP/IP protocol driver, such as tcpip.sys). Nevertheless, it should be understood that other network stack configurations are contemplated for other implementations of the described technology. Note that a separate NIC 310 may be used to connect the front-end computing system 300 to the communications network 308 and the client computing system 304.

A webserver driver 318 manages a front-end queue 322 and the back-end queue 336. For example, http.sys is an HTTP protocol driver running as a kernel mode webserver driver between a TCP/IP protocol driver and the user mode router and service processes (e.g., a web service processes, HTTP service process). The HTTP response 340 is passed through the back-end queue 336, an API 328, and a protocol interface 334 to a router 324. If the back-end computing system 302 declines to process the HTTP request, the router 324 of the front-end computing system 300 can request that another back-end computing system process the client's request. Otherwise, the router 324 of the front-end computing system 300 instructs web server driver 318 to forward the data blocks of the client's HTTP request through the kernel 307 to the designated back-end computing system 302 without passing the data blocks to the user mode.

FIG. 4 illustrates a kernel mode web server driver 418 of a front-end computing system 400 fast forwarding data blocks of a request to a designated back-end computing system 402. In the illustrated part of the processing flow, the back-end computing system 402 has indicated acceptance of the front-end computing system's request to process the client's HTTP request, and a router 424 front-end computing system 400 has instructed a webserver driver 418 to fast forward the data blocks of the client's HTTP request to the back-end computing system 402. Accordingly, the HTTP request data blocks 450 are forwarded in the kernel 407 from the front-end queue 422 to the back-end queue 436 and then out through the network stack to the back-end computing system 402 for processing.

In the illustrated implementation, the network stack includes multiple hardware and software layers, including the NIC 438, a NIC driver 412, a network driver interface 414 (e.g., ndis.sys), and a transport protocol driver 416 (e.g., a TCP/IP protocol driver, such as tcpip.sys). Nevertheless, it should be understood that other network stack configurations are contemplated for other implementations of the described technology. Note that a separate NIC 410 may be used to connect the front-end computing system 400 to the communications network 408 and the client computing system 404.

FIG. 5 illustrates an example front-end server computing system 500 processing a response from a back-end computing system 502 after completion of processing a fast forwarded request by the back-end computing system 502. The back-end computing system 502 generates an HTTP response 560 (e.g., acknowledging receipt of the client's request and/or providing a result of the requested processing) and transmits the HTTP response 560 through the communications network 508 and the network stack of the front-end computing system 500.

In the illustrated implementation, the network stack includes multiple hardware and software layers, including the NIC 538, a NIC driver 512, a network driver interface 514 (e.g., ndis.sys), and a transport protocol driver 516 (e.g., a TCP/IP protocol driver, such as tcpip.sys). Nevertheless, it should be understood that other network stack configurations are contemplated for other implementations of the described technology. Note that a separate NIC 510 may be used to connect the front-end computing system 500 to the communications network 508 and the client computing system 504. The HTTP response 560 is received in the back-end queue 536, extracted from the back-end queue 536 by the router 524 through the API 528 and the protocol interface 534, and forwarded through the front-end queue 522 in the network stack to a client computing system 504.

It should be understood that the front-end computing system 500 can also implement a similar fast forwarding process for the HTTP response 560, such that the data blocks of the HTTP response 560 are not passed through the user mode components of the standard message flow. Also, in some implementations, the fast forwarding of request and (corresponding) response data blocks can be performed concurrently.

Figure 6:
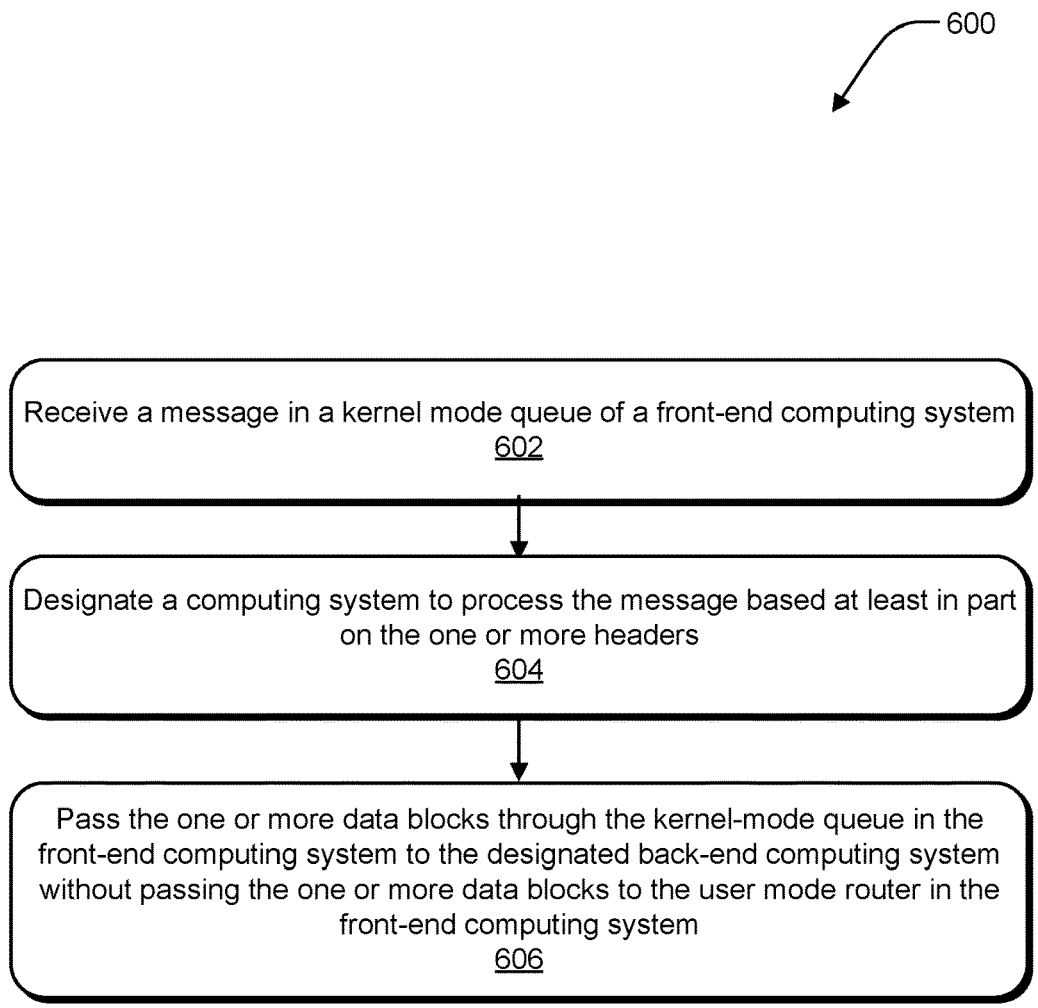
FIG. 6 illustrates example operations for forwarding a request through a front-end computing system.

FIG. 6 illustrates example operations 600 for forwarding a request through a front-end computing system. A receiving operation receives a message (e.g., an HTTP request or an HTTP response) in a kernel mode queue of a front-end computing system. The message includes one or more headers and one or more data blocks. A routing operation 604 designates a computing system (e.g., a back-end computing system if the message is an HTTP request or a client computing system if the message is an HTTP response) to process the message based at least in part on the one or more headers of the message. A communications operation 506 passes the one or more data blocks through the kernel mode queue in the front-end computing system to the designated computing system without passing the one or more data blocks to the user mode router in the front-end computing system.

Figure 7:
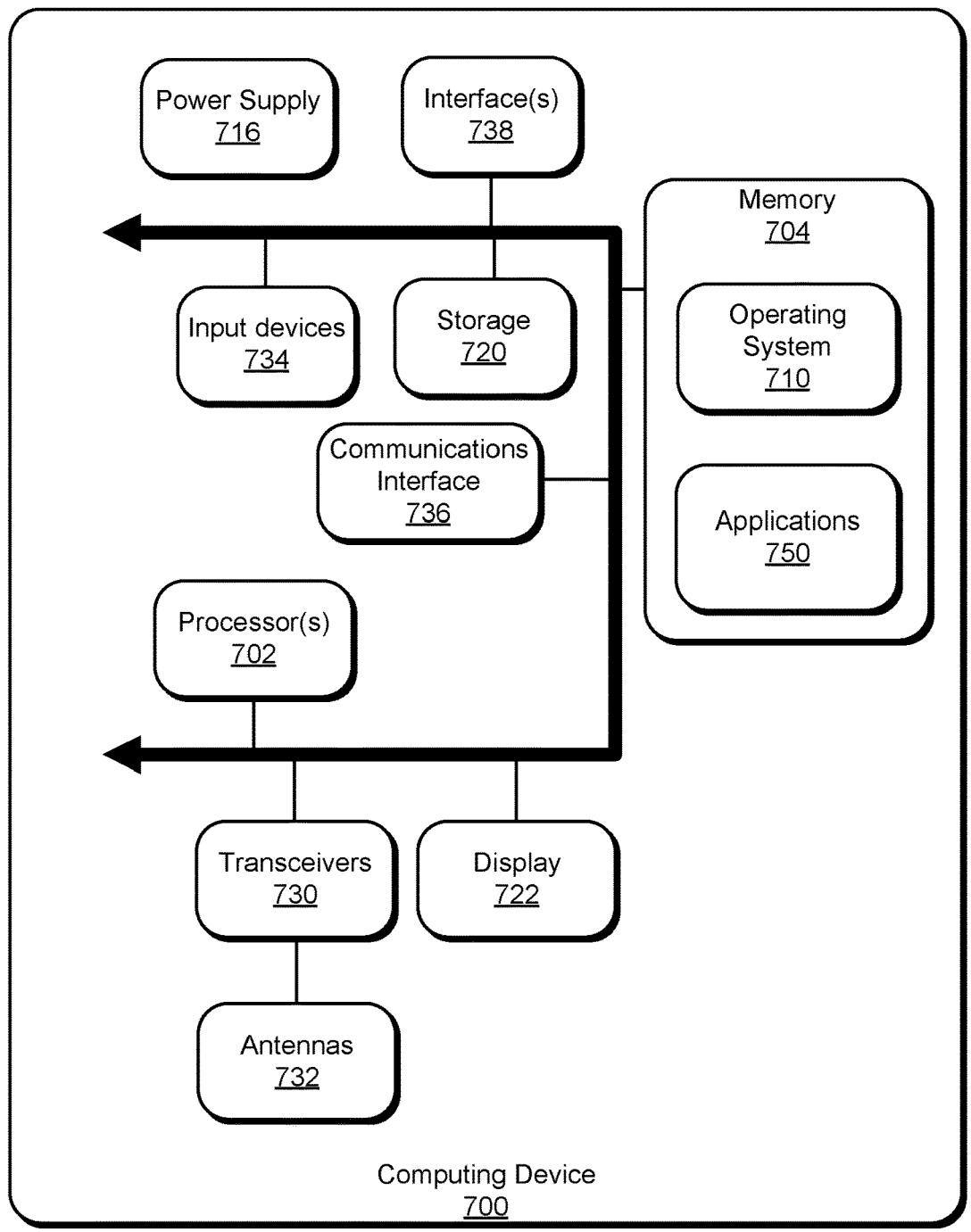
FIG. 7 illustrates exampled hardware and software that can be useful in implementing the described technology.

FIG. 7 illustrates an example computing device 700 for implementing the features and operations of the described technology. The computing device 700 may embody a remote control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 700 includes one or more processor(s) 702 and a memory 704. The memory 704 generally includes both volatile memory (e.g., RAM) and nonvolatile memory (e.g., flash memory). An operating system 710 resides in the memory 704 and is executed by the processor(s) 702.

In an example computing device 700, as shown in FIG. 7, one or more modules or segments, such as applications 750, a router process, a webserver driver, a network stack component, and other services, workloads, and modules, are loaded into the operating system 710 on the memory 704 and/or storage 720 and executed by processor(s) 702. The storage 720 may include one or more tangible storage media devices and may store locally and globally unique identifiers, requests, responses, headers, data blocks, and other data and be local to the computing device 700 or may be remote and communicatively connected to the computing device 700.

The computing device 700 includes a power supply 716, which is powered by one or more batteries or other power sources and which provides power to other components of the computing device 700. The power supply 716 may also be connected to an external power source that overrides or recharges the built-in batteries or other power sources.

The computing device 700 may include one or more communication transceivers 730, which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The computing device 700 may further include a network adapter 736, which is a type of computing device. The computing device 700 may use the adapter and any other types of computing devices for establishing connections over a wide-area network (WAN) or local-area network (LAN). It should be appreciated that the network connections shown are exemplary and that other computing devices and means for establishing a communications link between the computing device 700 and other devices may be used.

The computing device 700 may include one or more input devices 734 such that a user may enter commands and information (e.g., a keyboard or mouse). These and other input devices may be coupled to the server by one or more interfaces 738, such as a serial port interface, parallel port, or universal serial bus (USB). The computing device 700 may further include a display 722, such as a touch screen display.

The computing device 700 may include a variety of tangible processor-readable storage media and intangible processor-readable communication signals. Tangible processor-readable storage can be embodied by any available media that can be accessed by the computing device 700 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote control device and/or a physical controlled device 802 implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

An example method of forwarding a message through a front-end computing system includes receiving the message in a kernel mode queue of the front-end computing system, the message including one or more headers and an entity body including one or more data blocks; designating, by a user mode router in the front-end computing system, a computing system to process the message based at least in part on the one or more headers; and passing the one or more data blocks through the kernel mode queue in the front-end computing system to the designated computing system without passing the one or more data blocks to the user mode router in the front-end computing system.

Another method of any preceding method is provided, wherein the designating operation includes extracting the one or more headers from the message to the user mode router in the front-end computing system; routing a request including the one or more headers from the front-end computing system to the designated computing system, the request requesting the designated computing system to process the message; and receiving a response to the request from the front-end computing system at the front-end computing system, based at least in part on the response indicating to the front-end computing system that the designated computing system can process the message.

Another method of any preceding method is provided, wherein the message is a request, and the designated computing system is a back-end computing system designated to process the request.

Another method of any preceding method is provided, wherein the message is a response, and the designated computing system is a client computing system designated to process the response.

Another method of any preceding method is provided, wherein the one or more data blocks of the message are passed between a front-end queue and a back-end queue within a kernel mode webserver driver of the front-end computing system.

Another method of any preceding method is provided, wherein the message is received by the front-end computing system as a request from a client computing system via a unified network stack in kernel mode of the front-end computing system and the one or more data blocks are transmitted to the designated computing system via the unified network stack of the front-end computing system.

Another method of any preceding method is provided, wherein the message is received by the front-end computing system as a response from a back-end computing system via a unified network stack in kernel mode of the front-end computing system and the one or more data blocks transmitted to the designated computing system via the unified network stack of the front-end computing system.

An example front-end computing system for forwarding a message through the front-end computing system includes one or more hardware processors; memory; a kernel mode queue in the memory of the front-end computing system, the message being received in the kernel mode queue of the front-end computing system, the message including one or more headers and an entity body including one or more data blocks; a user mode router in the front-end computing system, the user mode router being executable by the one or more hardware processors and configured to designate a computing system to process the message based at least in part on the one or more headers; and a kernel mode webserver driver executable by the one or more hardware processors and configured to pass the one or more data blocks through the kernel mode queue in the front-end computing system to the designated computing system without passing the one or more data blocks to the user mode router in the front-end computing system.

Another example front-end computing system of any preceding system is provided, wherein the user mode router is further configured to extract the one or more headers from the message to the user mode router in the front-end computing system; route a request including the one or more headers from the front-end computing system to the designated computing system, the request requesting the designated computing system to process the message; and receive a response to the request from the designated computing system at the front-end computing system, based at least in part on the response indicating to the front-end computing system that the designated computing system can process the message.

Another example front-end computing system of any preceding system is provided, wherein the message is a request, and the designated computing system is a back-end computing system designated to process the request.

Another example front-end computing system of any preceding system is provided, wherein the message is a response, and the designated computing system is a client computing system designated to process the response.

Another example front-end computing system of any preceding system is provided, wherein the one or more data blocks of the message are passed between a front-end queue and a back-end queue within the kernel mode webserver driver of the front-end computing system.

Another example front-end computing system of any preceding system is provided, wherein the message is received by the front-end computing system as a request from a client computing system via a unified network stack in kernel mode of the front-end computing system and the one or more data blocks are transmitted to the designated computing system via the unified network stack of the front-end computing system.

Another example front-end computing system of any preceding system is provided, wherein the message is received by the front-end computing system as a response from a back-end computing system via a unified network stack in kernel mode of the front-end computing system and the one or more data blocks transmitted to the designated computing system via the unified network stack of the front-end computing system.

One or more example tangible processor-readable storage media of a tangible article of manufacture encoding processor-executable instructions for executing a computing process on a front-end computing system for forwarding a message through the front-end computing system is provided. The computing process includes receiving the message in a kernel mode queue of the front-end computing system, the message including one or more headers and an entity body including one or more data blocks; designating, by a user mode router in the front-end computing system, a computing system to process the message based at least in part on the one or more headers; and passing the one or more data blocks through the kernel mode queue in the front-end computing system to the designated computing system without passing the one or more data blocks to the user mode router in the front-end computing system.

Other one or more example tangible processor-readable storage media of any preceding media are provided, wherein the designating operation includes extracting the one or more headers from the message to the user mode router in the front-end computing system; routing a request including the one or more headers from the front-end computing system to the designated computing system, the request requesting the designated computing system to process the message; and receiving a response to the request from the designated computing system at the front-end computing system, based at least in part on the response indicating to the front-end computing system that the designated computing system can process the message.

Other one or more example tangible processor-readable storage media of any preceding media are provided, wherein the message is a request, and the designated computing system is a back-end computing system designated to process the request.

Other one or more example tangible processor-readable storage media of any preceding media are provided, wherein the one or more data blocks of the message are passed between a front-end queue and a back-end queue within a kernel mode web server driver of the front-end computing system.

Other one or more example tangible processor-readable storage media of any preceding media are provided, wherein the message is received by the front-end computing system as a request from a client computing system via a unified network stack in kernel mode of the front-end computing system and the one or more data blocks are transmitted to the designated computing system via the unified network stack of the front-end computing system.

Other one or more example tangible processor-readable storage media of any preceding media are provided, wherein the message is received by the front-end computing system as a response from a back-end computing system via a unified network stack in kernel mode of the front-end computing system and the one or more data blocks transmitted to the designated computing system via the unified network stack of the front-end computing system.

Another example system of forwarding a message through a front-end computing system includes means for receiving the message in a kernel mode queue of the front-end computing system, the message including one or more headers and an entity body including one or more data blocks; means for designating, by a user mode router in the front-end computing system, a computing system to process the message based at least in part on the one or more headers; and means for passing the one or more data blocks through the kernel mode queue in the front-end computing system to the designated computing system without passing the one or more data blocks to the user mode router in the front-end computing system.

Another system of any preceding system is provided, wherein the means for designating includes means for extracting the one or more headers from the message to the user mode router in the front-end computing system; means for routing a request including the one or more headers from the front-end computing system to the designated computing system, the request requesting the designated computing system to process the message; and means for receiving a response to the request from the designated computing system at the front-end computing system, based at least in part on the response indicating to the front-end computing system that the designated computing system can process the message.

Another system of any preceding system is provided, wherein the message is a request, and the designated computing system is a back-end computing system designated to process the request.

Another system of any preceding system is system, wherein the message is a response, and the designated computing system is a client computing system designated to process the response.

Another system of any preceding system is provided, wherein the one or more data blocks of the message are passed between a front-end queue and a back-end queue within a kernel mode webserver driver of the front-end computing system.

Another system of any preceding system is provided, wherein the message is received by the front-end computing system as a request from a client computing system via a unified network stack in kernel mode of the front-end computing system and the one or more data blocks are transmitted to the designated computing system via the unified network stack of the front-end computing system.

Another system of any preceding method is system, wherein the message is received by the front-end computing system as a response from a back-end computing system via a unified network stack in kernel mode of the front-end computing system and the one or more data blocks transmitted to the designated computing system via the unified network stack of the front-end computing system.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method of forwarding a message through a front-end computing system, the method comprising:
    receiving the message in a kernel mode of the front-end computing system, the message including one or more headers and an entity body including one or more data blocks;
    designating, by a user mode router in the front-end computing system, a computing system to process the message based at least in part on the one or more headers;
    generating a request for processing the message based at least in part on the one or more headers;
    sending the request to the computing system;
    receiving a response informing the front-end computing system whether the computing system can process the message;
    based on the response informing the front-end computing system that the computing system can process the message;
    forwarding the one or more data blocks of the message from a front-end queue within a kernel mode webserver driver of the front-end computing system to a back-end queue within the kernel mode webserver driver of the front-end computing system; and passing the one or more data blocks from the back-end queue within the kernel mode webserver driver of the front-end computing system to the computing system without passing the one or more data blocks to the user mode router in the front-end computing system; and based on the response informing the front-end computing system that the computing system cannot process the message, requesting another computing system to process the message.

2. The method of claim 1, wherein the message is associated with another request, and the computing system is a back-end computing system designated to process the other request.

3. The method of claim 1, wherein the message is received by the front-end computing system as another request from a client computing system via a unified network stack in the kernel mode of the front-end computing system and the one or more data blocks are transmitted to the computing system via the unified network stack of the front-end computing system.

4. A front-end computing system comprising:
one or more hardware processors; and
one or more tangible processor-readable storage media of a tangible article of manufacture encoding processor-executable instructions for executing operations on the front-end computing system for forwarding a message, the operations comprising:
receiving the message in a kernel mode of the front-end computing system, the message including one or more headers and an entity body including one or more data blocks;
designating, by a user mode router in the front-end computing system, a computing system to process the message based at least in part on the one or more headers;
forwarding the one or more data blocks of the message from a front-end queue within a kernel mode webserver driver of the front-end computing system to a back-end queue within the kernel mode webserver driver of the front-end computing system; and
passing the one or more data blocks in the back-end queue within the kernel mode webserver driver of the front-end computing system to the computing system without passing the one or more data blocks to the user mode router in the front-end computing system.

5. The front-end computing system of claim 4, wherein the designating comprises:
extracting the one or more headers from the message to the user mode router in the front-end computing system;
routing a request including the one or more headers from the front-end computing system to the computing system, the request requesting the computing system to process the message; and receiving a response to the request from the computing system at the front-end computing system, the response indicating to the front-end computing system that the computing system can process the message.

6. The front-end computing system of claim 4, wherein the message is a request, and the computing system is a back-end computing system designated to process the request.

7. The front-end computing system of claim 4, wherein the message is received by the front-end computing system as a request from a client computing system via a unified network stack in the kernel mode of the front-end computing system and the one or more data blocks are transmitted to the computing system via the unified network stack of the front-end computing system.

8. A method of forwarding a message through a front-end computing system, the method comprising:
receiving the message in a kernel mode of the front-end computing system, the message including one or more headers and an entity body including one or more data blocks;
designating, by a user mode router in the front-end computing system, a computing system to process the message based at least in part on the one or more headers;
forwarding the one or more data blocks of the message from a front-end queue within a kernel mode webserver driver of the front-end computing system to a back-end queue within the kernel mode webserver driver of the front-end computing system; and
passing the one or more data blocks in the back-end queue within the kernel mode webserver driver of the front-end computing system to the computing system without passing the one or more data blocks to the user mode router in the front-end computing system.

9. The method of claim 8, further comprising:
extracting the one or more headers from the message to the user mode router in the front-end computing system;
routing a request including the one or more headers from the front-end computing system to the computing system, the request requesting the computing system to process the message; and
receiving a response to the request from the computing system at the front-end computing system, the response indicating to the front-end computing system that the computing system can process the message.

10. The method of claim 8, wherein the message is a request, and the computing system is a back-end computing system designated to process the request.

11. The method of claim 8, wherein the message is received by the front-end computing system as a request from a client computing system via a unified network stack in the kernel mode of the front-end computing system and the one or more data blocks are transmitted to the computing system via the unified network stack of the front-end computing system.

* * * * *